Figure 3:
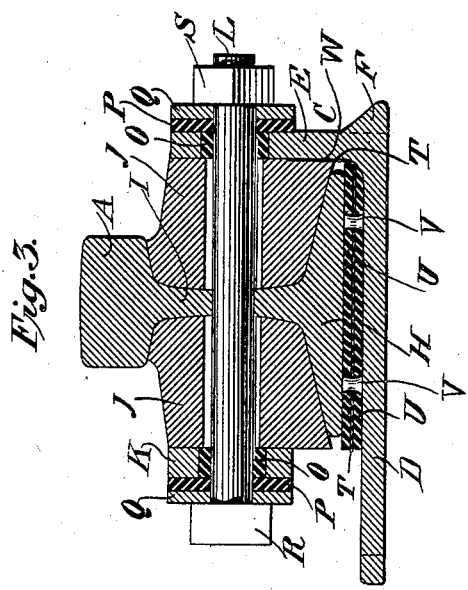

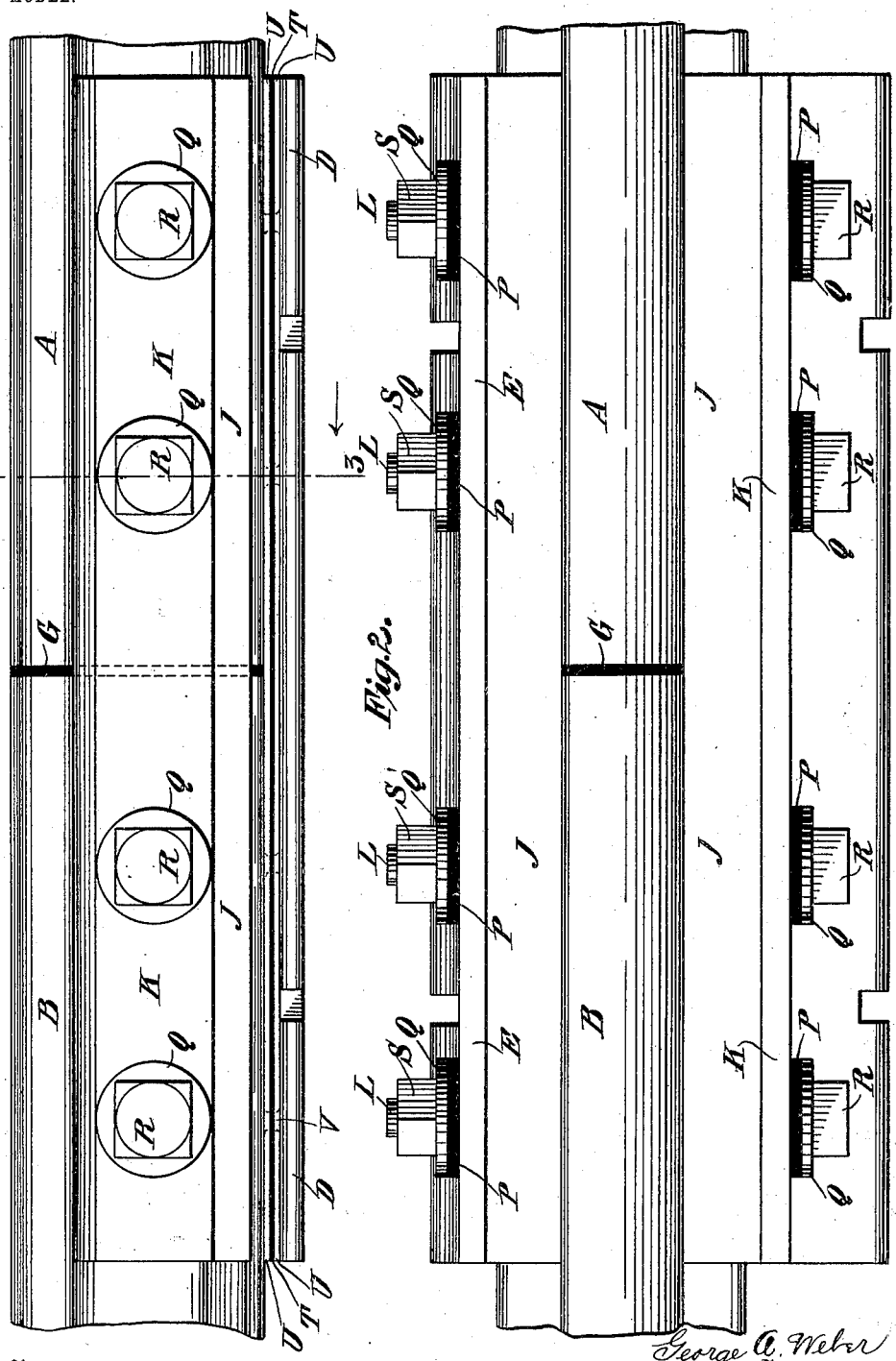

No. 744,832. PATENTED NOV. 24, 1903.
G. A. WEBER.
INSULATED RAIL JOINT.
APPLICATION FILED APR. 15, 1903.
NO MODEL. 2 SHEETS—SHEET 2.

No. 744,832. Patented November 24, 1903.

UNITED STATES PATENT OFFICE.

GEORGE A. WEBER, OF NEW YORK, N. Y., ASSIGNOR TO THE WEBER RAILWAY JOINT MANUFACTURING COMPANY, OF NEW YORK, N. Y., A CORPORATION OF WEST VIRGINIA.

INSULATED RAIL-JOINT.

SPECIFICATION forming part of Letters Patent No. 744,832, dated November 24, 1903.

Application filed April 15, 1903. Serial No. 152,740. (No model.)

*To all whom it may concern:*

Be it known that I, GEORGE A. WEBER, a citizen of the United States, and a resident of the borough of Manhattan, city, county, and State of New York, have invented certain new and useful Improvements in Insulated Rail-Joints, of which the following is a specification, accompanied by drawings.

My invention relates to railroad-rail joints, but more particularly to insulated joints for railroad-rail sections; and the objects of my invention are to increase the efficiency of the joint and enable a higher degree of insulation to be obtained than heretofore.

Another object of my invention is to afford more adequate means than heretofore for securing the insulation in position beneath the bases of the meeting ends of the rails.

Further objects of my invention will hereinafter appear, and to these ends my invention consists of an insulated joint embodying the features of construction, combinations of elements, and arrangement of parts substantially as hereinafter fully described and claimed in this specification and shown in the accompanying drawings, in which—

Figure 1 is a side view of a rail-joint embodying my invention. Fig. 2 is a plan view of the same. Fig. 3 is a transverse sectional view of Fig. 1.

Referring to the drawings, A and B represent the meeting ends of rail-sections, as shown, the bases of the rails being supported upon a suitable rail-chair C, comprising the base D and bolt-plate or upright E, there being a fillet or spiking-rib F extending longitudinally of the rail-chair at the juncture of the base and upright. Suitable insulation G may be inserted between the meeting faces of the ends of the rail-sections, and the base H of at least one of the rails is insulated from the base D of the rail-chair by suitable insulation, hereinafter to be described, and according to my invention improved means are provided for securing the insulation in position beneath the bases of the rails.

Arranged each side of the joint and extending along the webs I of the rails are secured filling-blocks J, of any suitable material, shown in this instance as wood, one of these blocks being inserted between the webs of the rails and the upright E of the angle-chair, while a strengthening-bar K extends across the joint outside of the other block J.

Suitable bolts L secure the parts of the joint together, and means are provided for insulating said bolts from the metallic parts of the joint, as shown in this instance insulating-sleeves O being arranged over the shanks of the bolts to insulate them from the upright E of the angle-chair and from the strengthening-bar K. Insulating-washers P are inserted between the metallic washers Q and the upright E and the strengthening-bar K, respectively. The heads R of the bolts L and nuts S bear upon the washers Q.

Owing to the vibration in the joint due to constant wear and tear and travel thereover the insulation beneath the bases of the rails is apt to become displaced and slide out of place, thus permitting short circuits, and it is desirable that secure and efficient means be utilized for maintaining the insulation in proper position beneath the rails to insulate the bases of the rails from the rail-chair C. It is also desirable that the insulation beneath the bases of the rails be of such character that it will stand vibration and wear without substantial injury which may cause short circuits. In Fig. 3 a tough insulating fabric T is arranged between two insulating layers U of fiber, and if desired the three layers may be riveted to each other by suitable rivets V, of insulating material. The layers U of fiber protect the thinner insulating layer T of fabric, while the combination of insulating layers produces high insulation of great wearing quality. The rivets V, which may be arranged at any suitable intervals throughout the layers, add to the efficiency and toughness of the layers. As shown in the drawings, a portion W of the fabric T is extended beyond the layers U of fiber and carried upwardly between the block J and the upright E of the rail-chair, so that when the joint is tightened by tightening the heads S of the bolts L the portion W of insulating fabric T is securely clamped or pinched between the block J and upright E. According to this construction secure and efficient means are provided for maintaining the insulating layers in position beneath the bases of the rails, and another function of the rivets V is here apparent, for they prevent the fabric from slipping from between the layers U of fiber, thus making the three layers as one. The fabric T is so thin that the portion W extending between the block J and upright E does not derange the joint in any manner, but permits the block J to lie flat against the upright E.

Obviously some features of my invention may be used without others, and my invention may be embodied in widely-varying forms.

Therefore without limiting myself to the construction shown and described nor enumerating equivalents, I claim, and desire to secure by Letters Patent, the following:

1. An insulated joint for railroad-rail sections comprising the meeting ends of rails, an angle-chair, insulating-blocks of packing material arranged at each side of the joint, and insulation between the chair and the base of at least one of the rails, said insulation comprising a thin intermediate sheet of highly-insulating material between protecting layers of insulating material, the intermediate sheet being extended upwardly between one of the insulating-blocks and the rail-chair, to aid in maintaining the insulation in position upon the chair, for substantially the purposes set forth.

2. An insulated joint for railroad-rail sections comprising the meeting ends of rails, an angle-chair, insulating-blocks of packing material arranged at each side of the joint, and insulation between the chair and the base of at least one of the rails, said insulation comprising a thin intermediate sheet of highly-insulating fabric between protecting layers of insulating fiber, the intermediate sheet being extended upwardly between one of the insulating-blocks and the rail-chair, to aid in maintaining the insulation in position upon the chair, for substantially the purposes set forth.

3. An insulated joint for railroad-rail sections comprising the meeting ends of rails, an angle-chair, insulating-blocks of packing material arranged at each side of the joint, and insulation between the chair and the base of at least one of the rails, said insulation comprising a plurality of sheets of insulating material secured together, the intermediate sheet of insulation being extended upwardly between one of the packing-blocks and the rail-chair, to aid in maintaining the insulation in position upon the chair, for substantially the purposes set forth.

4. An insulated rail-joint, comprising the meeting ends of rails and a suitable rail-support therefor, means for maintaining said rails in alinement, and insulated bolts for securing the parts of the joint together, there being insulation beneath the base of at least one of the rails, said insulation comprising a thin layer of material between relatively thicker layers, and the insulation being maintained in position by means of a portion of the intermediate layer, for substantially the purposes set forth.

5. An insulated rail-joint, comprising the meeting ends of rails and a suitable rail-support therefor, means for maintaining said rails in alinement, and insulated bolts for securing the parts of the joint together, there being insulation beneath the base of at least one of the rails, said insulation comprising a thin layer of material between relatively thicker layers, said thin layer being extended and gripped between two suitable parts of the joint to hold the insulation beneath the rail, for substantially the purposes set forth.

6. An insulated rail-joint, comprising the meeting ends of rails suitably maintained in alinement and insulated from each other, there being insulation arranged beneath the base of at least one of the rails, said insulation consisting of a plurality of layers of material riveted together by insulating-rivets, for substantially the purposes set forth.

7. An insulated rail-joint, comprising the meeting ends of rails suitably maintained in alinement and insulated from each other, at least a portion of the insulation used in the joint consisting of a plurality of layers of material riveted together by insulating-rivets, for substantially the purposes set forth.

In testimony whereof I have signed this specification in the presence of two subscribing witnesses.

GEORGE A. WEBER.

Witnesses:
 E. VAN ZANDT,
 A. L. O'BRIEN.